E. A. GREEN.
NUT LOCK.
APPLICATION FILED FEB. 19, 1920.
1,400,154.
Patented Dec. 13, 1921.
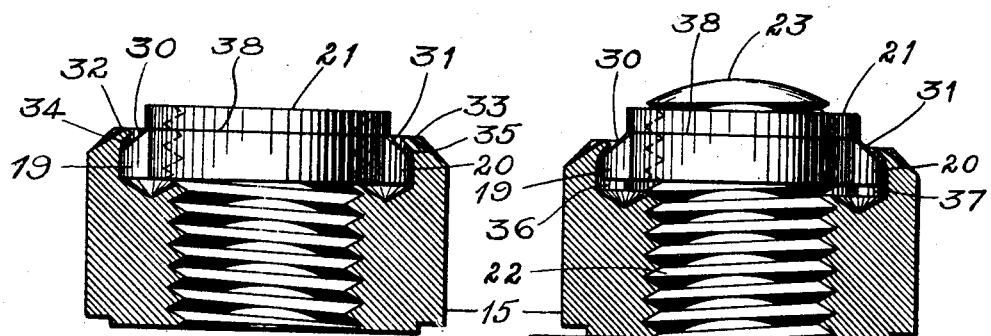
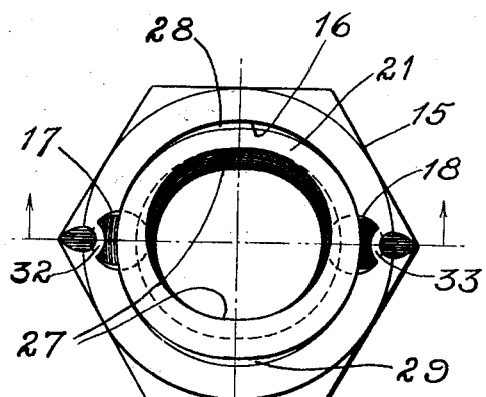
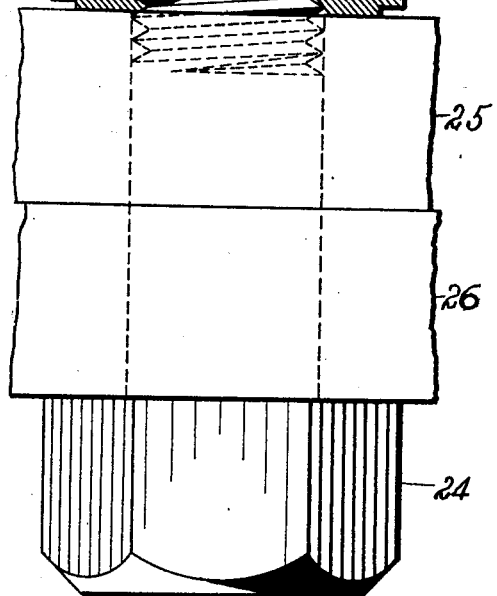
Fig-1
Fig-2
Fig-3
Edward N. Green
INVENTOR.
BY
ATTORNEY

UNITED STATES PATENT OFFICE.

EDWARD A. GREEN, OF CHICAGO, ILLINOIS.

NUT-LOCK.

1,400,154.　　　　　Specification of Letters Patent.　　Patented Dec. 13, 1921.

Application filed February 19, 1920. Serial No. 359,875.

*To all whom it may concern:*

Be it known that I, EDWARD A. GREEN, a citizen of the United States, residing at Chicago, in the county of Cook and State of Illinois, have invented certain new and useful Improvements in Nut-Locks, of which the following is a specification.

My invention relates to improvements in means for preventing accidental movement or loosening of bolt nuts, and has particular reference to such types of locks or retainers in which the latter are always held against contact with the faces of the retained nuts, several of which are described in Letters Patent Numbers 1,166,203 and 1,183,555 issued to me on December 28, 1915 and May 16, 1916, respectively. In these retainers the hold of the retainer is an effective friction grip of the threads of the retainer upon the threads of the bolt, which is attained in the commercially practicable manner by bringing diametrically opposite portions of lock or retainer threads slightly closer to each other than the corresponding thread portions of a nut and correspondingly expanding apart the portions of the threads of said lock or retainer which are substantially at right angles to the portions of threads brought closer together than the normal true circle distance. In this manner the object of the theoretically perfect self-locking nut—one with threads which are a true and close fit at all points on the bolt threads—is attained for practical purposes at a comparatively small cost. The usually limiting degrees of elasticity found in bolt nut metal is quite sufficient to make the friction grip attained as above stated, continuous. This form of lock also makes it possible to remove and replace the nut with its lock or retainer in the usual manner without destroying the locking element connected with the nut. And the chief object of the present invention is to permanently interlock the nut and its retainer so that these two elements cannot be accidentally separated during transportation or handling, or be subjected to incorrect assembling, or the coupling together or associating of nuts and retainers which would not coöperate to the best advantage.

With the foregoing in view the present invention consists in the novel construction, combination and arrangement of permanently coupled nut and retainer, hereinafter described in detail, illustrated in the accompanying drawing and more particularly pointed out in the appended claims.

In the drawing—

Figure 1 is a side elevtaion of a nut and retainer embodying my invention, the nut being shown in section.

Fig. 2 is a top plan view of same.

Fig. 3 is a repetition of Fig. 1 with the nut and retainer in changed relative positions and applied to a bolt and structural parts.

In the several views 15 represents a hexagon form of nut in the crown face of which is a counter-bore 16 in opposite wall portions of which are depressions or recesses 17 and 18. The latter are substantially longitudinally split halves of drill bores arranged on opposite angles of the wrenching faces of the nut with centers substantially on the circle of the counterbore. These remainders 17 and 18 of drill holes extend to the bottom of the counterbore and below said bottom to the extent of the usual conical or tapered drill point, whereby the semi-circular troughs or recesses 17 and 18 are made of uniform capacity from the crown face of the nut to the bottom of the counterbore.

One of the essential aims and objects of the present improvement is its embodiment in such form and arrangement that the rapid and automatic machine processes are made available in its manufacture, and not merely this but that also the simpler and less expensive form of such processes may be employed. Hence, for instance, the simple drill bore is substituted for the recess requiring the work of the slower and more expensive milling machine. In the present improvement the open side wall recesses 17 and 18 are made with ordinary drills and drilling machines by the process of first making drill holes at 17 and 18 and then making the counterbore 16 so that it intersects said drill holes and leaves recesses that are as true and uniform as the work of a drill, and which, otherwise made, would involve many times the expense of the simple drill hole. In making the recesses 17 and 18 and the counterbore 16 a multiple boring head is used. To this is fed by an automatic and simple feeding mechanism standard tapped nuts, which are converted by substantially a single operation into the recessed nuts embodying the present improvement, by first drilling the two holes at 17 and 18 and then immediately thereafter making the counterbore 16 with a larger drill or other suitable counterbore recess-forming device. The successive steps of first making the small holes and then the larger intersecting hole are subject to very simple automatic machine timing whether made by drill, punch or otherwise and whether made before or after the nut is bored and threaded, although as indicated, standard tapped nuts, supplied to the market in great quantities and ready for services otherwise, are all that is required for the purpose of carrying out the present improvement with comparatively small additional expense.

The recesses 17 and 18 are provided for and engaged by lugs or ears 19 and 20 on a threaded retainer nut 21 the body of which is seated in the counterbore 16. The retainer 21 together with the nut 15 engage threads 22 on a bolt 23 the head of which is labeled 24. Between the latter and the nut two pieces of structure 25 and 26 are shown in Fig. 3. The lugs 19 and 20 are substantially semi-circular projections from diametrically opposite sides of the retainer nut 21.

Said retainer nut is slightly flattened in the directions of its axis which makes its threads—27—slightly elliptical or expanded at right angles to the line of compression and contracted on said line, which leaves spaces 28 and 29 between the periphery of the retainer and the circular wall of the counterbore 16, as indicated in Fig. 2. The proximate part of the expanded retainer nut thread is thereby readily engaged with the end of the bolt thread, while continued rotation of the thus engaged retainer nut will cause the cramped portion of the retainer nut threads to engage the threads of the bolt with a firm spring-grip.

The retainer 21 is loosely held in the counterbore 16 against accidental separation from the nut by integral and coöperative parts of the nut and retainer, consisting of beveled or inclined upper surfaces 30 and 31 over which are inwardly projected or bent counterbore wall portions 32 and 33 which form stops in the paths of outward movement of said lugs, as shown in the three views. The inward projections 32 and 33 are arranged to leave spaces 34 and 35 (Fig. 1) above the inclines of the lugs when the retainer rests on the bottom of the counterbore, or spaces 36 and 37 below the lugs when the latter are elevated into contact with said stops, as shown in Fig. 3. In other words, the stops are arranged to permit the necessary spacing apart movement and the slight lateral movement of the retainer that will assist in its "taking" the first thread of the bolt after the retainer has been carried by the protruding end of the bolt, as in Fig. 3, the predetermined distance away from the nut.

On the periphery of the retainer is a slightly indented or otherwise formed line 38 which, as in Fig. 1, is normally on the plane of the crown face of the nut and which is provided as a gage line to assist in the correct assembling of nut and retainer, any separation of said nut and retainer being, as indicated in Fig. 3, being registered by a corresponding elevation of the gage line. The oppositely placed connections between the nut and retainer, in the lugs and their recesses, obtain a balanced torque which prevents lateral thrust during revolution and the stops 32 and 33 prevent undue spacing apart of nut and retainer as well as insure their permanent association when not mounted on a bolt. The combination of features in the present improvement is provided particularly for mechanisms subjected to frequent disassembling.

I claim as my invention—

1. The combination with a nut having a counterbore and recesses in the walls of said counterbore, of a retainer having lugs thereon which are movable in said recesses, and means limiting the movements of said lugs along said recesses.

2. The combination with a nut having a counterbore therein, of shallow recesses in the sides of said counterbore, the bottoms of said recesses being at their outer ends projected into the spaces of said recesses as stops, and a retainer having lugs movable in said recesses between said stops and the bottom ends of said recesses.

3. The combination with a nut having a counterbore in the face thereof and recesses in parallel side portions of said counterbore, of a retainer, lugs on said retainer which engage said recesses, and stops at the ends of said recesses which limit the movement of said retainer in said counterbore.

4. The combination with a nut having a counterbore and recesses open to said counterbore, of a retainer having lugs engaged with said recesses and movable therein, and stops in said recesses which prevent displacement therefrom of said lugs.

5. The combination with a nut, of a retainer, means coupling said nut and retainer together for limited relative movements longitudinally and laterally, and means for gaging such longitudinal movement.

In testimony whereof I have hereunto signed my name.

EDWARD A. GREEN.